Aug. 17, 1954    J. E. NEISWANGER    2,686,493
TIRE DEFLATION INDICATOR
Filed Nov. 14, 1952

John E. Neiswanger
INVENTOR.

Patented Aug. 17, 1954

2,686,493

UNITED STATES PATENT OFFICE 2,686,493

TIRE DEFLATION INDICATOR

John E. Neiswanger, Brownwood, Tex.

Application November 14, 1952, Serial No. 320,398

1 Claim. (Cl. 116—34)

The present invention relates to an improved danger signaling device for pneumatic tires and, as the title implies, has reference to a finger or vibratory wire possessing resonance, whereby when the finger, which is associated with the tire tread and ground or other surface, comes into dragging contact with the surface, a low pressure danger alarm is thus obtained.

One object of the invention, obviously, is to structurally, functionally, and otherwise improve upon similarly constructed and performing prior art indicators and alarms for dangerously low pneumatic tires and in doing so, to provide a special structural adaptation in which manufacturers and users will find their essential requirements satisfactorily met.

Another object is, in general, to improve upon and reduce the number of parts entering into the construction, thereby not only increasing the efficiency of the structure as a whole, but also rendering the same less costly to manufacture and otherwise simplify factors of assembling and sale.

In carrying out a preferred embodiment of the invention, a simple linearly straight wire rod or equivalent member is utilized and this is of a prescribed length and constitutes a ground contacting and raking finger which when it comes into play produces sufficient of an audible signal to warn that the tire with which it is associated has become dangerously deflated, the upper end of said finger having a coil spring whereby it may be more satisfactorily joined with the spring and axle with which it has associated cooperation.

Then, too, novelty is predicated on the stated finger with the coil spring and adapter fixture means comprising a simple angle bracket and a U-shaped clip carried by the bracket, the coil spring on the finger being supported by the U-shaped clip.

Other objects, features and advantages will become more readily apparent from the following description and the accompanying sheet of drawings.

In the accompanying drawings wherein like numerals are employed to designate like parts throughout the views.

Figure 1:
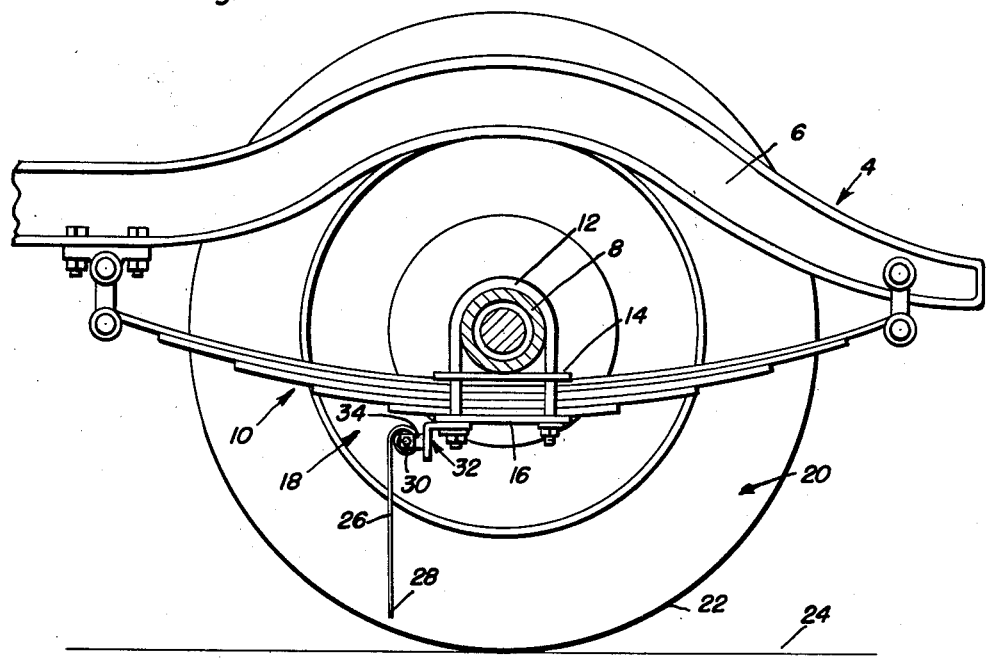
Figure 1 is a view in section and elevation showing the essential components of the over-all combination and showing in particular the indicating or signaling finger and means for attaching the same.
Figure 2:
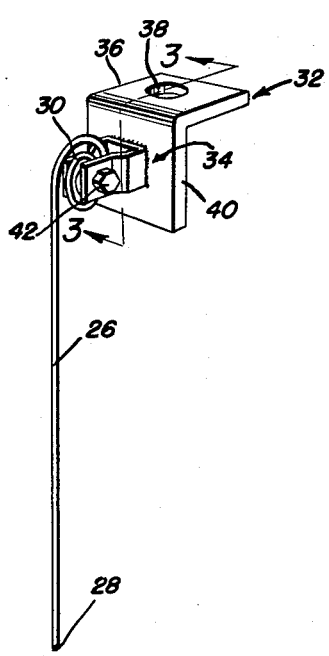
Figure 2 is a perspective view of the attachment by itself.
Figure 3:
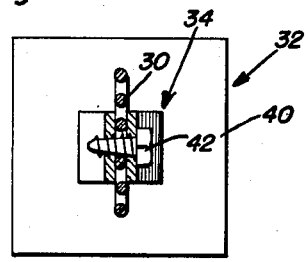
Figure 3 is a section on the line 3—3 of Figure 2 looking in the direction of the arrows.

Referring now to the drawings by way of reference numerals and accompanying lead lines, the chassis, a portion of which is shown, is denoted by the numeral 4 and includes what may be called a frame member 6. The axle structure, generally speaking, is denoted at 8 and the leaf-type suspension spring is denoted at 10 and it is joined at its ends with the chassis by customary shackle devices. The means for joining the center portion of the spring with the axle includes one or more inverted U-shaped bolts or clevises and the one appearing in the drawings is denoted by the numeral 12 and the complemental cleats are denoted at 14 and 16, these being in clamping relation with the leaves of the spring 10. The automobile axle supporting wheel is denoted generally by the numeral 18 and the pneumatic tire at 20. The tread 22 is shown in contacting relation in respect to the ground or other surface which is to be traversed and the latter is denoted by the numeral 24.

As before mentioned, the indicator finger is a length of wire or a similar linearly straight rod member 26 which constitutes the indicating finger and the lower free end of which 28 is adapted to cooperate with the ground or other surface 24 in predetermined vertically spaced relationship. The upper end of the wire is coiled to form a spiral spring 30.

The adapter means for properly associating the indicator finger with the other components of the over-all combination comprises companion parts, one of which may be referred to as an angle bracket 32 and the other as a clip 34. The angle bracket is L-shaped and the horizontal flange 36 is provided with a bolt hole 38 to accommodate the bolt and nut means as shown in Figure 1. It is to be noted that this bracket is joined to the forward limb or leg of the clevis so that the finger hangs down beneath the forward half portion of the spring means 10. The vertical or apron flange 40 carries the U-shaped clip 34 between the arms of which the coil spring is situated and secured by way of the bolt 42. Thus a single bracket, clip, and bolt provide satisfactory ways and means for joining the upper coiled end of an indicating finger with the spring means and axle by way of a clevis.

It will be evident that the lower end 28 has a definite relationship to the tread of the tire 22 when the tire is normally inflated. This means therefore that said lower end is at a fixed distance or spacing above the ground. Obviously, so long as the tire is kept properly inflated, nothing happens insofar as the signaling finger is concerned.

When, however, the air in the tire leaks out and the tire becomes deflated, the lower end of the finger obviously comes into contact with the ground and the finger rakes and drags along and produces sufficient of a noisy response to attract the attention of the driver of the automobile and to warn him that the associated tire is dangerously deflated and needs attention.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

For use on and in association with the suspension spring and associated axle and adjoining clevis between the axle and spring; a readily applicable and removable tire deflation indicator comprising a linearly straight indicating finger having one end free to engage the ground or other surface, having its opposite end formed with a coil spring, the convolutions of said spring being coplanar with each other and also in a plane common to said finger, a U-shaped clip, means removably bolting the coil spring between the arms of said clip, and an adaptor bracket, said bracket being L-shaped and embodying a horizontal flange provided with a bolt hole to accommodate existing bolt and nut means cooperable with the stated clevis, the vertical flange being substantially parallel to said finger and the bight portion of said clip being affixed to said vertical flange, whereby a single bracket, clip and bolt provides adequate and satisfactory means for joining the coil of the indicating finger with the aforementioned suspension spring.

References Cited in the file of this patent

UNITED STATES PATENTS

| Number | Name | Date |
|---|---|---|
| 1,358,156 | Jansen | Nov. 9, 1920 |
| 1,447,595 | Martin | Mar. 6, 1923 |
| 1,809,373 | Bonnette | June 9, 1931 |
| 2,281,806 | Schulman | May 5, 1942 |
| 2,464,365 | Aves | Mar. 15, 1949 |
| 2,642,830 | Aves | June 23, 1953 |